US012012147B2

(12) United States Patent
Tsuboi et al.

(10) Patent No.: US 12,012,147 B2
(45) Date of Patent: Jun. 18, 2024

(54) VEHICLE FRONT PORTION STRUCTURE

(71) Applicant: HONDA MOTOR CO., LTD., Tokyo (JP)

(72) Inventors: Wataru Tsuboi, Tokyo (JP); Naoki Nakamoto, Tokyo (JP); Takehiro Kondo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/090,541

(22) Filed: Dec. 29, 2022

(65) Prior Publication Data

US 2023/0227107 A1 Jul. 20, 2023

(30) Foreign Application Priority Data

Jan. 14, 2022 (JP) ................................ 2022-004101

(51) Int. Cl.
*B62D 21/11* (2006.01)
(52) U.S. Cl.
CPC .................................... *B62D 21/11* (2013.01)
(58) Field of Classification Search
CPC .... B62D 25/08; B62D 25/2018; B62D 21/11; B62D 21/155; B60G 7/008; B60G 7/02
See application file for complete search history.

(56) References Cited

U.S. PATENT DOCUMENTS

| 5,605,353 A * | 2/1997 | Moss ..................... B62D 21/09 188/376 |
| 5,884,963 A * | 3/1999 | Esposito .............. B62D 27/065 280/784 |
| 6,270,152 B1 * | 8/2001 | Sato ....................... B62D 21/11 296/203.02 |
| 6,349,953 B1 * | 2/2002 | Yoshihira ................. B60G 7/02 280/124.109 |

(Continued)

FOREIGN PATENT DOCUMENTS

| JP | 04-050082 | 2/1992 |
| JP | H09220917 A * | 8/1997 |

(Continued)

OTHER PUBLICATIONS

Japanese Office Action for Japanese Patent Application No. 2022-004101 mailed Aug. 29, 2023.

*Primary Examiner* — Laura Freedman
(74) *Attorney, Agent, or Firm* — Amin, Turocy & Watson, LLP

(57) ABSTRACT

A vehicle front portion structure includes: a rear end part that constitutes a rear part of a front side frame and has an inclination portion which is inclined downward toward a vehicle rearward direction; a fixation portion that is provided on the inclination portion; and a lower arm that is connected to the fixation portion. The inclination portion includes: a bottom section that is inclined downward toward a vehicle rearward direction; and a protrusion section that protrudes further upward than the bottom section. The protrusion (Continued)

section extends toward a vehicle rearward direction from a vehicle forward position further than the fixation portion, and a middle side in a vehicle width direction of the protrusion section protrudes further upward than an outside in the vehicle width direction of the protrusion section.

5 Claims, 5 Drawing Sheets

(56) References Cited

U.S. PATENT DOCUMENTS

| | | | | |
|---|---|---|---|---|
| 6,857,691 | B2* | 2/2005 | Kuroda | B62D 25/2018 |
| | | | | 296/203.02 |
| 7,066,531 | B2* | 6/2006 | Tomita | B62D 21/152 |
| | | | | 180/68.5 |
| 9,150,253 | B2* | 10/2015 | Watanabe | B62D 27/065 |
| 9,266,563 | B1* | 2/2016 | Han | B62D 21/00 |
| 11,577,785 | B2* | 2/2023 | Kim | B62D 27/06 |
| 11,643,148 | B2* | 5/2023 | Kondo | B62D 21/155 |
| | | | | 296/209 |
| 11,673,609 | B2* | 6/2023 | Anzai | B62D 21/11 |
| | | | | 280/784 |
| 2012/0286543 | A1* | 11/2012 | Lee | B62D 21/11 |
| | | | | 296/204 |

FOREIGN PATENT DOCUMENTS

| | | | |
|---|---|---|---|
| JP | 2010132026 A * | 6/2010 | |
| JP | 2012-076703 | 4/2012 | |
| JP | 2017-128175 | 7/2017 | |

* cited by examiner

VEHICLE FRONT PORTION STRUCTURE

CROSS-REFERENCE TO RELATED APPLICATION

Priority is claimed on Japanese Patent Application No. 2022-004101, filed on Jan. 14, 2022, the contents of which are incorporated herein by reference.

BACKGROUND

Field of the Invention

The present invention relates to a vehicle front portion structure.

Background

As a vehicle front portion structure, a configuration is known in which a center frame and a front side frame are connected by a connection portion, and the connection portion and a sub-frame are fixed by a fixation portion. A flange at a front upper portion of the center frame is connected to a dash lower panel, and a front portion of the center frame includes a rear inclination portion that is inclined upward toward a vehicle rearward direction. In the center frame, the sub-frame is fixed via the fixation portion to a flat portion at a vehicle forward position relative to the rear inclination portion. Further, a lower arm that supports a suspension is connected to a rear part (which may be referred to as a rear end part) of the front side frame and the sub-frame (for example, refer to Japanese Patent No. 2017-128175).

SUMMARY

Here, for example, it is conceivable that an inclination portion is formed on the rear end part, and the lower arm is supported by the inclination portion. For example, the fixation portion (specifically, a collar) is connected to the inclination portion of the rear end part by a connection portion by welding or the like, and the lower arm is connected to the rear end part via the fixation portion.

In this case, there is a possibility that water which flows into the rear end part of the front side frame accumulates in the connection portion of the fixation portion via the inclination portion and may cause the connection portion to deteriorate due to rust or the like.

An aspect of the present invention is intended to provide a vehicle front portion structure that is capable of preventing water from accumulating in a connection portion between a rear end part and a fixation portion and thereby preventing the connection portion from deteriorating due to rust or the like.

A vehicle front portion structure according to a first aspect of the present invention includes: a rear end part that constitutes a rear part of a front side frame and has an inclination portion which is inclined downward toward a vehicle rearward direction; a fixation portion that is provided on the inclination portion; and a lower arm that is connected to the fixation portion, wherein the inclination portion includes a bottom section that is inclined downward toward a vehicle rearward direction and a protrusion section that protrudes further upward than the bottom section, the protrusion section extends toward a vehicle rearward direction from a vehicle forward position further than the fixation portion, and a middle side in a vehicle width direction of the protrusion section protrudes further upward than an outside in the vehicle width direction of the protrusion section.

According to such a configuration, it is possible to allow water that flows into the rear end part of the front side frame to flow so as to avoid the protrusion section. Here, the protrusion section extends toward the vehicle rearward direction from the vehicle forward position further than the fixation portion. Thereby, it is possible to allow the water that flows into the rear end part to flow around the fixation portion. Accordingly, for example, it is possible to prevent water from accumulating in a connection portion at which the fixation portion is connected to the protrusion section by welding, bonding, or the like, and it is possible to prevent the connection portion from deteriorating due to rust or the like.

In a second aspect, the fixation portion may be a collar having an outer circumference that is connected to the protrusion section, and the protrusion section may be extended outward in the vehicle width direction relative to the collar.

Here, for example, the fixation portion (collar) is connected to the inclination portion by welding, bonding, or the like. In particular, when the fixation portion is connected to the inclination portion by welding, there is a possibility that the connection portion by way of welding may deteriorate due to rust or the like generated by water. Accordingly, in this configuration, the protrusion section is extended outward in the vehicle width direction relative to the collar. Therefore, water that flows into the rear end part cannot easily flow to the connection portion. Thereby, it is possible to prevent water from accumulating in the connection portion, and it is possible to prevent the connection portion from deteriorating due to rust or the like.

In a third aspect, a portion on a vehicle forward side and a portion of a vehicle rearward side of the outer circumference of the collar may be connected to the protrusion section by a connection portion.

According to such a configuration, for example, it is possible to prevent the width of the protrusion section from widening in the vehicle width direction compared to a case where the connection portion is provided in the vehicle width direction. Thereby, it is possible to smoothly widen the width in the vehicle width direction of the protrusion section from a front end portion to a collar vicinity portion, and it is possible to prevent a water flow from accumulating in a region where the width in the vehicle width direction widens.

Further, the connection portion on the vehicle forward side and the connection portion on the vehicle rearward side can be provided on a top section of the collar vicinity portion in the protrusion section. Thereby, it is possible to further favorably prevent the water that flows into the rear end part from accumulating in the connection portion.

In a fourth aspect, the protrusion section may include a front end portion in which the width in a vehicle width direction of a portion on a vehicle forward side of the rear end part is formed to be narrower than that near the fixation portion.

According to such a configuration, water that flows into the rear end part can be reliably guided by the front end portion to the bottom section that is provided on the outside in the vehicle width direction of the front end portion. Thereby, it is possible to allow the water that flows into the rear end part to flow around the fixation portion.

On the other hand, for example, when the width in the vehicle width direction of the front end portion is widened, water that flows into the rear end part may flow over the front end portion and onto an upper surface of the protrusion section. Therefore, it is conceivable that water accumulates in the connection portion, which causes the connection portion to deteriorate due to rust or the like.

Further, by forming the width of the front end portion to be narrow, the width of the bottom section can be ensured to be wide in a portion (which may be referred to as a forward portion) on a vehicle forward side of the rear end part. Therefore, for example, a welding space of spot welding or the like can be ensured at the forward portion of the rear end part. Thereby, it is possible to ensure the rigidity of the rear end part, and components such as the fixation portion and the lower arm can be firmly fixed to the inclination portion.

In a fifth aspect, the rear end part may extend so as to be inclined downward toward a vehicle rearward direction from a rear end portion of the front side frame main body of the front side frame, the front side frame main body may extend from a vehicle forward direction toward the vehicle rearward direction, and the protrusion section may be formed such that the width in a vehicle width direction of a portion of the protrusion section at which the rear end part and the front side frame main body overlap each other is narrower than that near the fixation portion.

According to such a configuration, in the portion at which the rear end part and the front side frame main body overlap each other, a wide width of the bottom section can be ensured. Thereby, the rear end part (particularly, the inclination portion) and front side frame main body can be connected, for example, by a welding work such as spot welding without being interfered by the protrusion section. Accordingly, workability by welding is improved, and components such as the fixation portion and the lower arm can be firmly fixed to the inclination portion.

In a sixth aspect, the protrusion section may be provided at a vehicle forward position relative to the fixation portion and may have a recess portion that is recessed downward.

According to such a configuration, for example, when connecting the outer circumference of the fixation portion to the inclination portion (particularly, the protrusion section) by welding such as mig welding, the welding work can be performed by operating the equipment for the mig welding (for example, a nozzle, a metal electrode rod, or the like) without being interfered by the protrusion section. Thereby, it is possible to improve the workability by welding when connecting the outer circumference of the fixation portion to the protrusion section by welding.

According to an aspect of the present invention, it is possible to prevent water from accumulating in the connection portion between the rear end part and the fixation portion and thereby prevent the connection portion from deteriorating due to rust or the like.

DESCRIPTION OF EMBODIMENTS

Figure 1:
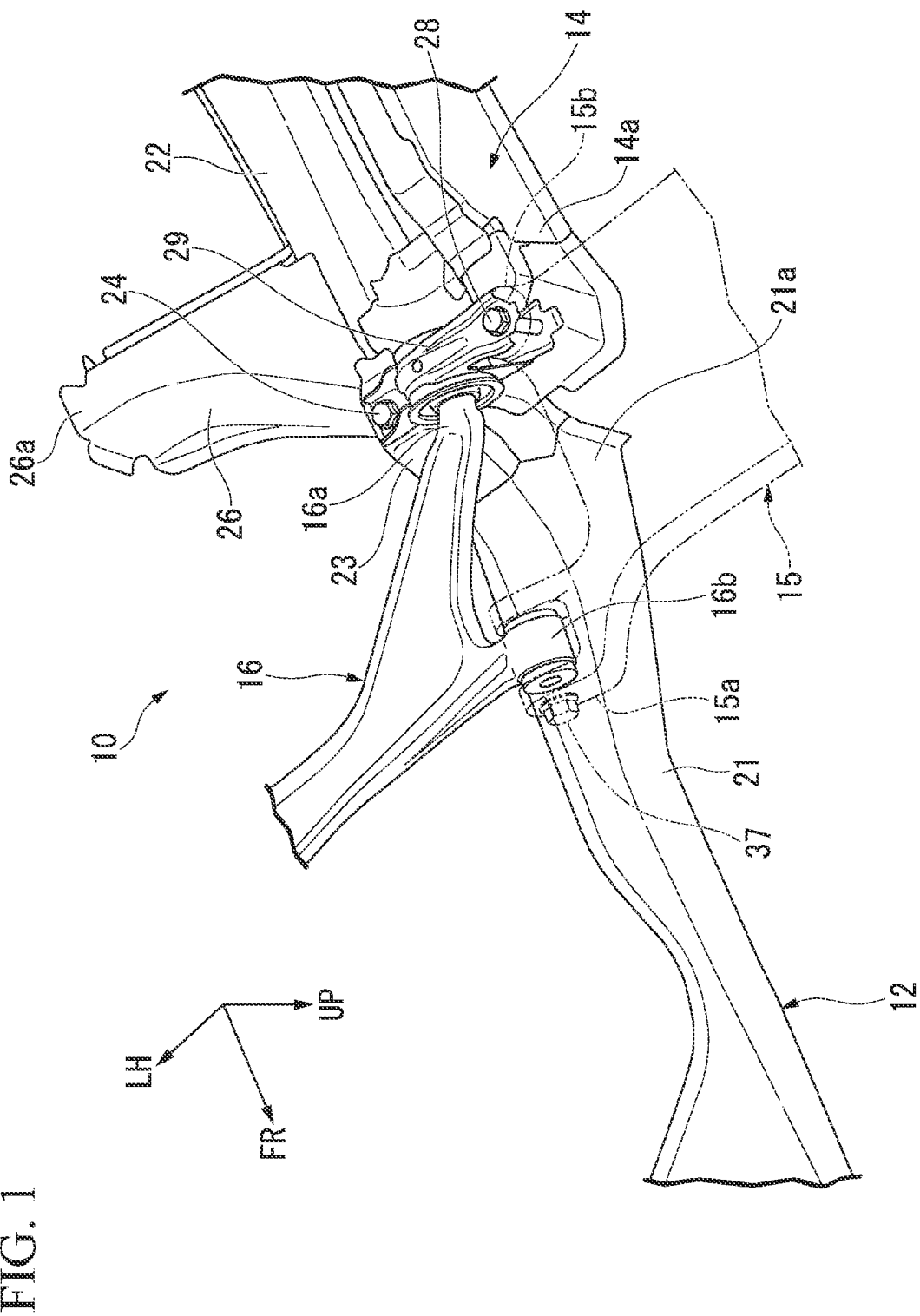
FIG. 1 is a perspective view of a vehicle front portion structure in an embodiment of the present invention when seen from a front right lower direction.

Hereinafter, a vehicle front portion structure of an embodiment of the present invention will be described with reference to the drawings. In the drawings, an arrow FR indicates a vehicle forward direction, an arrow UP indicates a vehicle upward direction, and an arrow LH indicates a vehicle leftward direction.

Vehicle Front Portion Structure

Figure 2:
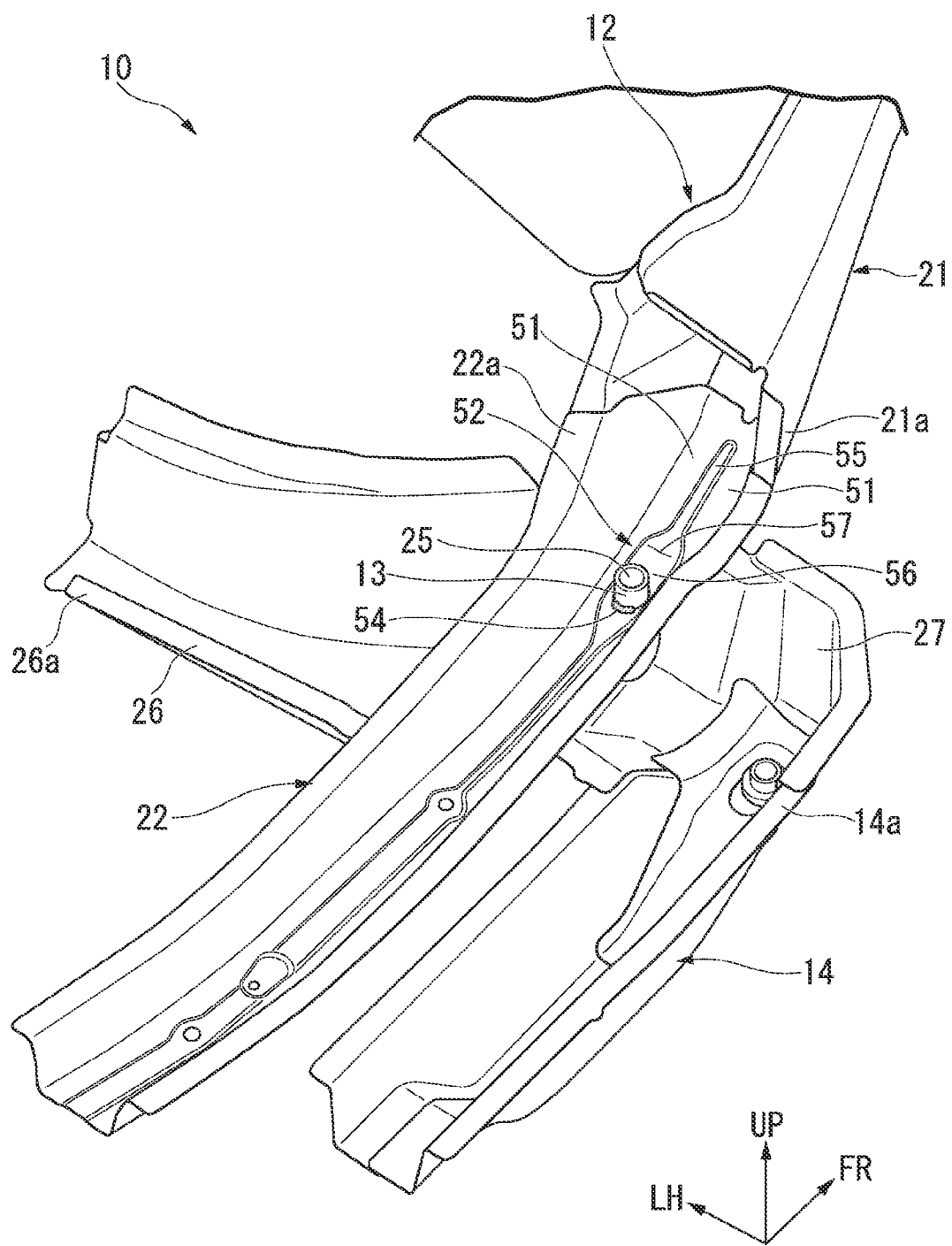
FIG. 2 is a perspective view of the vehicle front portion structure in the embodiment of the present invention when seen from a rear right upper direction.

FIG. 1 is a perspective view of a vehicle front portion structure 10 when seen from a front right lower direction. FIG. 2 is a perspective view of the vehicle front portion structure 10 when seen from a rear right upper direction.

As shown in FIG. 1 and FIG. 2, the vehicle front portion structure 10 is a structure that constitutes a skeleton of a vehicle front portion. Specifically, the vehicle front portion structure 10 includes: for example, a front side frame 12; a fixation portion 13 that is provided on the front side frame 12; a center frame (tunnel side frame) 14 that is arranged further inward in a vehicle width direction than the front side frame 12; a sub-frame 15 that is arranged at a lower position than the front side frame 12 and the center frame 14; and a lower arm 16 that is connected to the sub-frame 15.

The front side frame 12 includes: a front side frame main body 21 that extends horizontally toward a vehicle rearward direction from a vehicle forward direction; and a rear end part 22 that constitutes a rear part of the front side frame 12. That is, the rear end part 22 is connected to a rear end portion 21a of the front side frame main body 21 in a state where a portion 22a on a vehicle forward side of the rear end part 22 overlaps the rear end portion 21a. The rear end part 22 extends so as to be inclined downward toward the vehicle rearward direction from the rear end portion 21a of the front side frame main body 21.

A lower arm bracket 23 (refer to also FIG. 5) is connected to the rear end part 22 from a lower direction. A fixation portion 13 is provided on the rear end part 22 and the lower arm bracket 23. A collar is used, for example, as the fixation portion 13. The collar has, for example, a penetration hole 25 through which an attachment bolt 24 (refer to also FIG. 5) can penetrate from a lower direction. Details of the fixation portion (collar) 13 and the rear end part 22 are described later.

An outrigger 26 that extends outward in the vehicle width direction is provided on the rear end part 22.

A side sill (not shown) extends toward the vehicle rearward direction from an outer end portion 26a of the outrigger 26.

The center frame 14 is arranged inward in the vehicle width direction relative to the rear end part 22. A front end portion 14a of the center frame 14 is connected to the rear end part 22 by the connection portion 27. The center frame 14 extends along a floor tunnel (not shown) toward the vehicle rearward direction and is connected to a floor frame (not shown).

The sub-frame 15 is arranged at a lower position than the front side frame main body 21 and the center frame 14. A front end portion 15a of the sub-frame 15 is fixed to the front side frame main body 21 from a lower direction. A rear end portion 15b of the sub-frame 15 is fixed to the front end portion 14a of the center frame 14 by an attachment bolt 28 from a lower direction.

A power source such as an engine and a transmission unit or a drive motor, a steering device, and the like are provided on the sub-frame 15.

A rear end portion 16a of the lower arm 16 is connected to the rear end portion 15b of the sub-frame 15 and the fixation portion 13 via a bracket 29 from a lower direction. The bracket 29 is fixed to the rear end portion 15b of the sub-frame 15 and the fixation portion 13 by the attachment bolt 24 and the attachment bolt 28.

A front end portion 16b of the lower arm 16 is connected to the front end portion 15a of the sub-frame 15 by an attachment bolt 37. A suspension (not shown) and the like are supported by the lower arm 16.

Rear End Part

Figure 3:
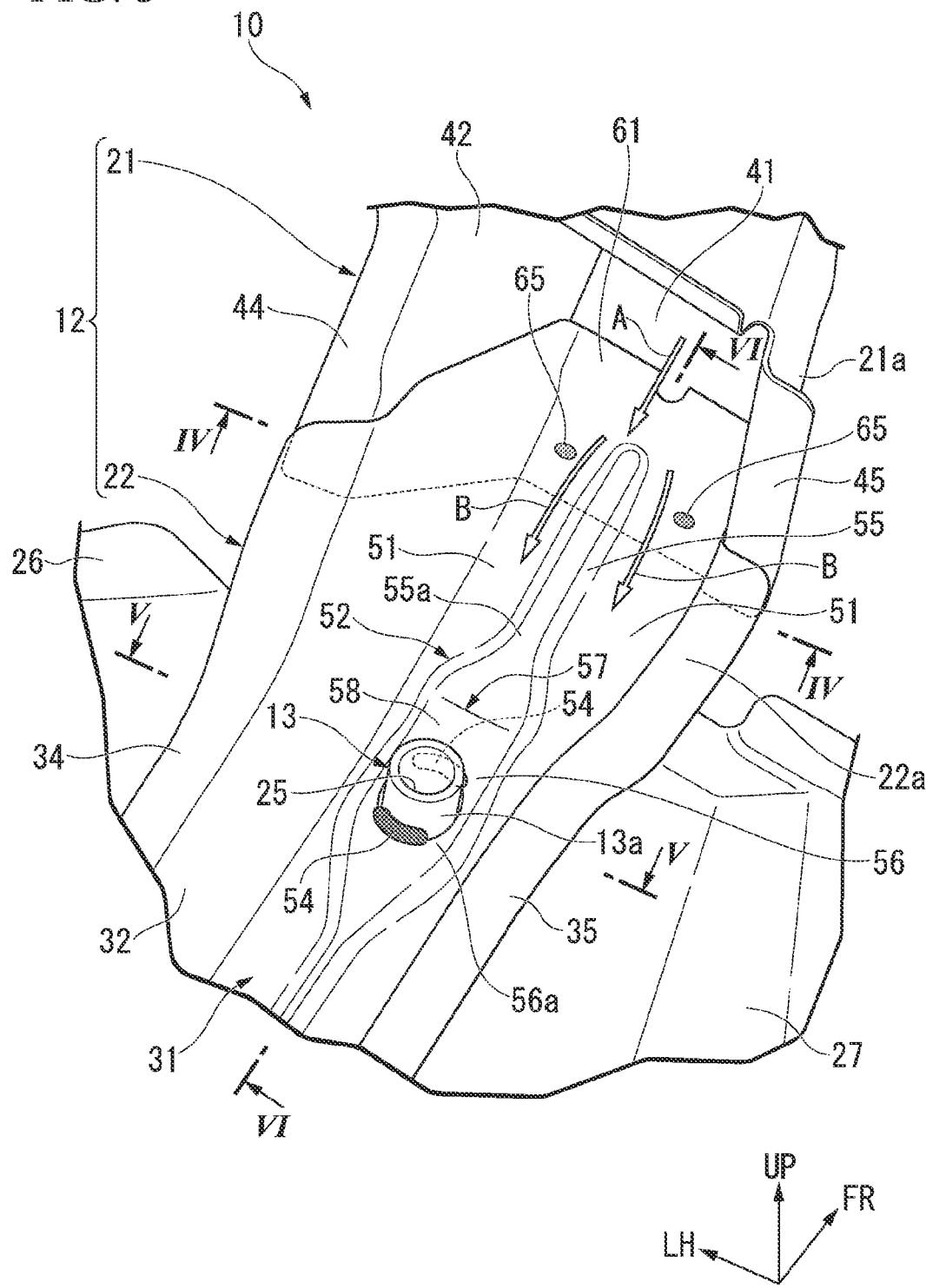
FIG. 3 is a perspective view of a front side frame main body and a rear end part in the embodiment of the present invention when seen from a rear right upper direction.
Figure 4:
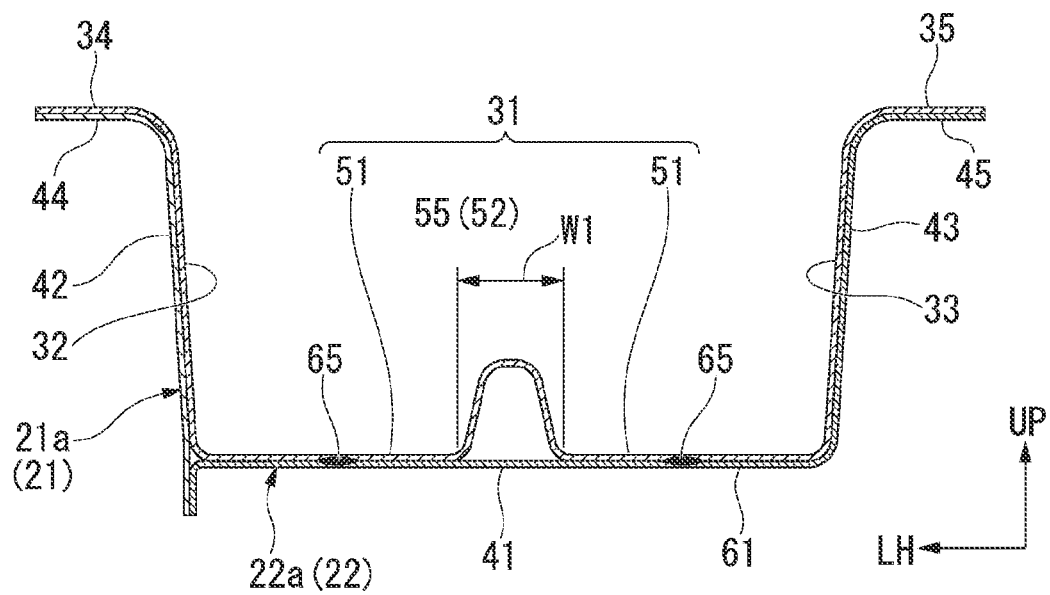
FIG. 4 is a cross-sectional view broken along a IV-IV line of FIG. 3.

FIG. 3 is a perspective view of the front side frame main body 21 and the rear end part 22 when seen from a rear right upper direction. FIG. 4 is a cross-sectional view broken along a IV-IV line of FIG. 3.

As shown in FIG. 3 and FIG. 4, the rear end part 22 extends so as to be inclined downward toward the vehicle rearward direction from the rear end portion 21a of the front side frame main body 21. The rear end part 22 includes: for example, an inclination portion 31 that overlaps the front side frame main body 21 from an upper direction; an outer wall portion 32 that stands upward from an outer side of the inclination portion 31; an inner wall portion 33 that stands upward from an inner side of the inclination portion 31; an outer flange 34 that extends outward in the vehicle width direction from an upper side of the outer wall portion 32; and an inner flange 35 that extends inward in the vehicle width direction from an upper side of the inner wall portion 33.

The inclination portion 31 is arranged to face upward, and a section on a vehicle forward side of the inclination portion 31 overlaps a rear end section of a frame bottom portion 41 of the front side frame main body 21 from an upper direction. The inclination portion 31 extends so as to be inclined downward toward the vehicle rearward direction from the rear end section of the frame bottom portion 41. Details of the inclination portion 31 will be described later.

A section on a vehicle forward side of the outer wall portion 32 overlaps a rear end section of a frame outer wall portion 42 of the front side frame main body 21 from the inside of the front side frame main body 21.

A section on a vehicle forward side of the inner wall portion 33 overlaps a rear end section of a frame inner wall portion 43 of the front side frame main body 21 from the inside of the front side frame main body 21.

A portion on a vehicle forward side of the outer flange 34 overlaps a rear end portion of a frame outer flange 44 of the front side frame main body 21 from an upper direction.

A portion on a vehicle forward side of the inner flange 35 overlaps a rear end portion of a frame inner flange 45 of the front side frame main body 21 from an upper direction.

That is, the portion 22a on the vehicle forward side of the rear end part 22 overlaps the rear end portion 21a of the front side frame main body 21. Hereinafter, the portion 22a on the vehicle forward side of the rear end part 22 may also be referred to as a "forward portion 22a".

Here, the rear end part 22 is formed of the inclination portion 31, the outer wall portion 32, the inner wall portion 33, the outer flange 34, and the inner flange 35 in a cross-sectional U-shape that opens upward.

The rear end portion 21a of the front side frame main body 21 is formed of the frame bottom portion 41, the frame outer wall portion 42, the frame inner wall portion 43, the frame outer flange 44, and the frame inner flange 45 in a cross-sectional U-shape that opens upward. A main portion of the front side frame main body 21 except the rear end portion 21a is formed in a closed cross-section.

The closed cross-section of the front side frame main body 21 is in communication with a U-shaped cross-section of the rear end part 22 via the rear end portion 21a of the front side frame main body 21. A dash lower panel (not shown) and a floor panel (not shown) are connected to the frame outer flange 44 and the frame inner flange 45 of the front side frame main body 21 and the outer flange 34 and the inner flange 35 of the rear end part 22 from an upper direction.

The dash lower panel is, for example, a panel that partitions an engine room (power source room) and a vehicle room. The floor panel is a panel that forms a floor portion of the vehicle room.

Inclination Portion, Fixation Portion

The inclination portion 31 includes: a bottom section 51; and a protrusion section 52 that protrudes further upward than the bottom section 51. The bottom section 51 is formed to be substantially horizontal in the vehicle width direction and extends so as to be inclined downward toward the vehicle rearward direction. The fixation portion 13 is provided on the protrusion section 52. In the embodiment, a collar 13 having a cylindrical shape is used as the fixation portion 13. Hereinafter, the fixation portion 13 may also be referred to as a "collar 13".

Figure 5:
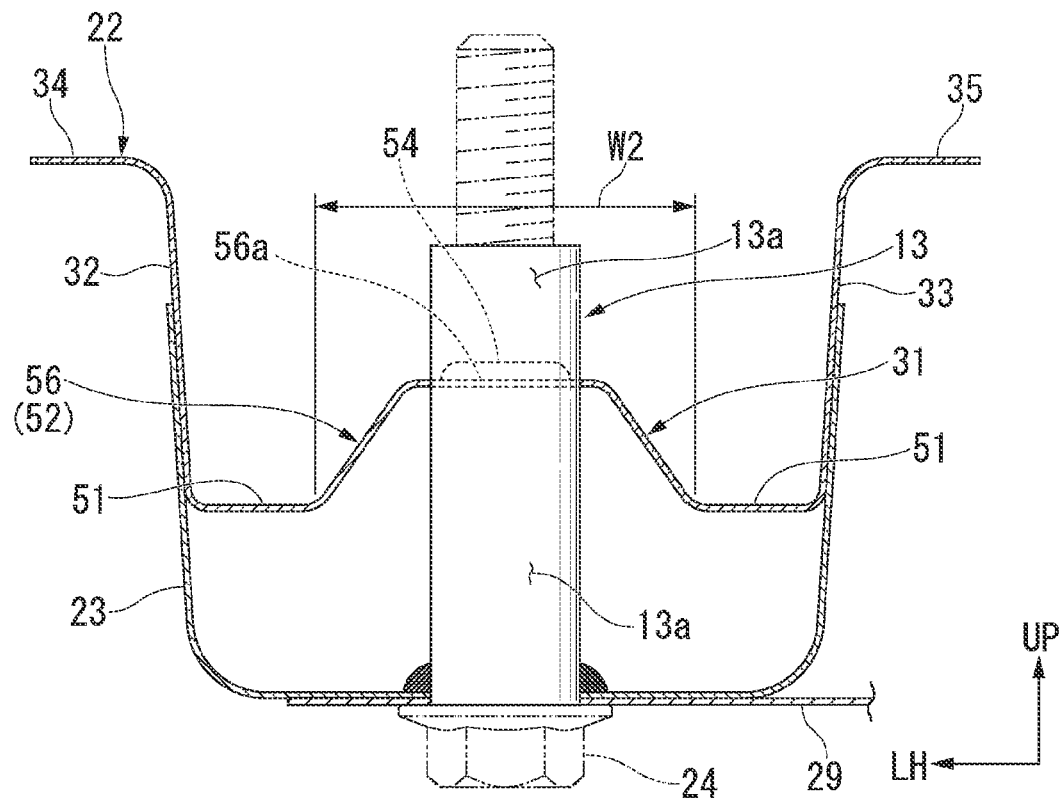
FIG. 5 is a cross-sectional view broken along a V-V line of FIG. 3.

FIG. 5 is a cross-sectional view broken along a V-V line of FIG. 3.

As shown in FIG. 3 and FIG. 5, the collar 13 is provided on a middle in the vehicle width direction of the protrusion section 52. A portion on the vehicle forward side and a portion on the vehicle rearward side of an outer circumference 13a of the collar 13 is connected to the protrusion section 52 by a connection portion 54 by way of welding, bonding, or the like. That is, the connection portion 54 is provided on the vehicle forward side and the vehicle rearward side of the outer circumference 13a of the collar 13.

As shown in FIG. 3 to FIG. 5, the protrusion section 52 extends toward the vehicle rearward direction from the vehicle forward position further than the collar 13, and a middle side in the vehicle width direction of the protrusion section 52 protrudes further upward than an outside in the vehicle width direction of the protrusion section 52. Specifically, the protrusion section 52 includes: a front end portion 55; a collar vicinity portion 56 (near the fixation portion 13) that is arranged at a further rearward position than the front end portion 55 and surrounds the collar 13; and a recess portion 57 (refer to also FIG. 6) that is formed on the collar vicinity portion 56.

A width W1 in the vehicle width direction of the front end portion 55 in in the forward portion 22a of the rear end part 22 is formed to be narrower than a width W2 of the collar vicinity portion 56. Details of the reason why the width W1 of the front end portion 55 is formed to be narrower than the width W2 of the collar vicinity portion 56 will be described later.

Here, the forward portion 22a of the rear end part 22 overlaps the rear end portion 21a of the front side frame main body 21. Therefore, the width W1 in the vehicle width direction of the front end portion 55 of the protrusion section 52 is formed to be narrower than the width W2 of the collar vicinity portion 56 in a portion 61 where the forward portion 22a of the rear end part 22 and the rear end portion 21a of the front side frame main body 21 overlap with each other.

Hereinafter, the portion 61 where the forward portion 22a of the rear end part 22 and the rear end portion 21a of the front side frame main body 21 overlap with each other may be referred to as an "overlapping portion 61".

The collar vicinity portion 56 is connected to an end section 55a on the vehicle rearward side of the front end portion 55. The collar vicinity portion 56 extends toward the vehicle rearward direction from the end section 55a on the vehicle rearward side of the front end portion 55.

The collar vicinity portion 56 is extended outward in the vehicle width direction relative to the collar 13. The collar 13 is provided on the middle in the vehicle width direction of the protrusion section 52 (specifically, the collar vicinity portion 56). In the front end portion 55 and the collar vicinity portion 56, a middle side in the vehicle width direction protrudes further upward than an outside in the vehicle width direction. Therefore, the collar 13 is provided on a top section 56a of the collar vicinity portion 56.

Additionally, the collar 13 is connected to the top section 56a of the collar vicinity portion 56 by the connection portion 54 that is provided on the portion on the vehicle forward side and the portion on the vehicle rearward side of the outer circumference 13a. Therefore, the connection portion 54 on the vehicle forward side and the connection portion 54 on the vehicle rearward side can be provided on the top section 56a of the collar vicinity portion 56.

Details of the reason why the collar 13 is provided on the top section 56a of the collar vicinity portion 56, and the connection portion 54 is provided on the top section 56a of the collar vicinity portion 56 will be described later.

Figure 6:
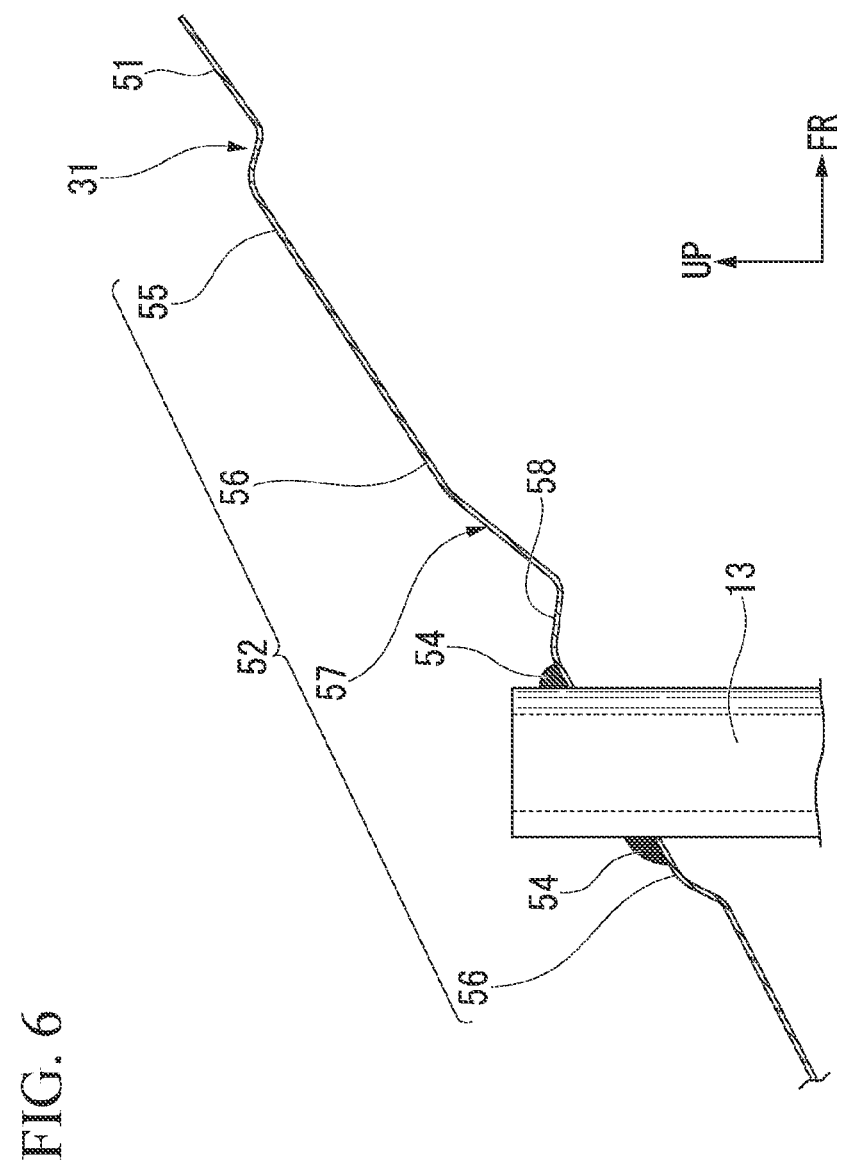
FIG. 6 is a cross-sectional view broken along a VI-VI line of FIG. 3.

FIG. 6 is a cross-sectional view broken along a VI-VI line of FIG. 3.

As shown in FIG. 3 and FIG. 6, the recess portion 57 is provided at a vehicle forward position relative to the collar 13 and is formed to be recessed downward. The recess portion 57 has a recess portion bottom surface 58 that forms a bottom section of the recess portion 57. The recess portion bottom surface 58 is formed at an upper position relative to the bottom section 51 of the inclination portion 31. The recess portion bottom surface 58 is formed, for example, at substantially the same height as the connection portion 54.

The embodiment is described using an example in which the recess portion 57 is formed on the collar vicinity portion 56; however, the recess portion 57 may be formed on both (that is, the protrusion section 52) of the collar vicinity portion 56 and the front end portion 55. Details of the reason why the recess portion 57 is provided at the vehicle forward position further than the collar 13 will be described later.

As described above, in the vehicle front portion structure 10 of the embodiment, as shown in FIG. 3 to FIG. 5, the protrusion section 52 is formed on the inclination portion 31 of the rear end part 22, and the protrusion section 52 protrudes further upward than the bottom section 51. Further, the protrusion section 52 extends toward the vehicle rearward direction from the vehicle forward position further than the collar 13. Additionally, the middle side in the vehicle width direction of the protrusion section 52 protrudes further upward than the outside in the vehicle width direction of the protrusion section 52.

Here, the closed cross-section of the front side frame main body 21 is in communication with the U-shaped cross-section of the rear end part 22 via the rear end portion 21a of the front side frame main body 21. Therefore, for example, it is conceivable that water flows from the front side frame main body 21 into the inclination portion 31 of the rear end part 22 as indicated by an arrow A. The protrusion section 52 is provided on the inclination portion of the rear end part 22.

As a result, it is possible to allow water that flows into the rear end part 22 as indicated by the arrow A to flow to the bottom section 51 so as to avoid the protrusion section 52 as indicated by an arrow B. Thereby, it is possible to allow the water that flows into the rear end part 22 to flow around the collar 13. Accordingly, for example, it is possible to prevent water from accumulating in the connection portion 54 at which the collar 13 is connected to the protrusion section 52, and it is possible to prevent the connection portion 54 from deteriorating due to rust or the like.

For example, the collar 13 is connected to the protrusion section 52 by welding, bonding, or the like.

In particular, when the collar 13 is connected to the protrusion section 52 by welding, there is a possibility that the connection portion 54 by way of welding may deteriorate due to rust or the like generated by water.

Accordingly, the collar vicinity portion 56 of the protrusion section 52 is extended outward in the vehicle width direction relative to the collar 13. Therefore, water that flows into the inclination portion 31 of the rear end part 22 as indicated by the arrow A cannot easily flow to the connection portion 54. Thereby, it is possible to prevent water from accumulating in the connection portion 54, and it is possible to prevent the connection portion 54 from deteriorating due to rust or the like.

Further, the connection portion 54 is provided on the vehicle forward side and the vehicle rearward side of the outer circumference 13a of the collar 13. Therefore, for example, it is possible to prevent the width of the protrusion section 52 from widening in the vehicle width direction compared to the case where the connection portion 54 is provided in the vehicle width direction. Thereby, it is possible to smoothly widen the width in the vehicle width direction of the protrusion section 52 from the front end portion 55 to the collar vicinity portion 56, and it is possible to prevent a water flow from accumulating in a region where the width in the vehicle width direction widens.

Further, the connection portion 54 on the vehicle forward side and the connection portion 54 on the vehicle rearward side can be provided on the top section 56a of the collar vicinity portion 56. Thereby, it is possible to further favorably prevent the water that flows into the rear end part 22 as indicated by the arrow A from accumulating in the connection portion 54.

Further, the front end portion 55 of the protrusion section 52 is provided on the forward portion 22a of the rear end part 22, and the width W1 in the vehicle width direction of the front end portion 55 is formed to be narrower than the collar vicinity portion 56. Therefore, water that flows into the rear end part 22 as indicated by the arrow A can be reliably guided by the front end portion 55 to the bottom section 51 that is provided on the outside in the vehicle width direction of the front end portion 55 as indicated by the arrow B. Thereby, it is possible to allow the water that flows into the rear end part 22 to flow around the collar 13.

On the other hand, for example, when the width in the vehicle width direction of the front end portion is widened, water that flows into the rear end part 22 as indicated by the arrow A may flow over the front end portion and onto the upper surface of the protrusion section. Therefore, there is a possibility that water accumulates in the connection portion 54, which causes the connection portion 54 to deteriorate due to rust or the like.

Further, the width W1 of the front end portion 55 is formed to be narrow in the forward portion 22a of the rear end part 22. Therefore, the width of the bottom section 51 can be ensured to be wide in the forward portion 22a of the rear end part 22. Accordingly, for example, the welding space of spot welding or the like can be ensured at the forward portion 22a of the rear end part 22.

Thereby, for example, in the forward portion 22a of the rear end part 22, the bottom section 51 of the inclination portion 31 can be firmly connected to the frame bottom portion 41 of the front side frame main body 21 by a connection portion 65 by way of welding. Accordingly, it is possible to ensure the rigidity of the rear end part 22, and components such as the collar 13 and the lower arm 16 can be firmly fixed to the inclination portion 31 of the rear end part 22.

Additionally, the width W1 of the front end portion 55a is formed to be narrower than the width W2 of the collar vicinity portion 56 in the overlapping portion 61 where the forward portion 22a of the rear end part 22 and the rear end portion 21a of the front side frame main body 21 overlap with each other. Therefore, a wide width of the bottom section 51 can be ensured in the overlapping portion 61. Thereby, the forward portion 22a of the rear end part 22 (particularly, the inclination portion 31) and the rear end portion 21a of the front side frame main body 21 can be connected, for example, by a welding work such as spot welding without being interfered by the protrusion section 52. Accordingly, workability by welding is improved, and components such as the collar 13 and the lower arm 16 can be firmly fixed to the inclination portion.

As shown in FIG. 3 and FIG. 6, the inclination portion 31 of the rear end part 22 is formed in an upward gradient from the collar 13 toward the vehicle forward direction. Therefore, the collar vicinity portion 56 is formed in an upward gradient from the collar 13 toward the vehicle forward direction. In such a case, when connecting the collar 13 to the collar vicinity portion 56 by welding such as mig welding, there is a possibility that the collar vicinity portion 56 may interfere with an operation of the equipment for the mig welding (for example, a nozzle, a metal electrode rod, or the like).

Accordingly, the recess portion 57 is provided on the collar vicinity portion 56 at a vehicle forward position of the collar 13, and the recess portion 57 is recessed downward. Therefore, for example, when connecting the outer circumference 13a (particularly, a portion on the vehicle forward side) of the collar 13 to the collar vicinity portion 56 by welding such as mig welding, the welding work can be performed by operating the equipment for the mig welding without being interfered by the collar vicinity portion 56.

Thereby, it is possible to improve the workability by welding when connecting the outer circumference 13a of the collar 13 to the collar vicinity portion 56 by welding.

Further, the recess portion 57 may be formed on both (that is, the protrusion section 52) of the collar vicinity portion 56 and the front end portion 55 in accordance with the size of the equipment for welding or the like.

The technical scope of the present invention is not limited to the embodiment described above, and various modifications can be added without departing from the scope of the present invention.

The component in the above embodiment can be appropriately replaced by a well-known component without departing from the scope of the present invention, and modification examples described above can be suitably combined.

What is claimed is:

1. A vehicle front portion structure comprising:
    a rear end part that constitutes a rear part of a front side frame and has an inclination portion which is inclined downward toward a vehicle rearward direction;
    a fixation portion that is provided on the inclination portion; and
    a lower arm that is connected to the fixation portion,
    wherein the inclination portion includes
        a bottom section that is inclined downward toward the vehicle rearward direction and
        a protrusion section that protrudes further upward than the bottom section,
    the protrusion section extends toward the vehicle rearward direction from a vehicle forward position further than the fixation portion,
    a middle side in a vehicle width direction of the protrusion section protrudes further upward than an outside in the vehicle width direction of the protrusion section, and
    the protrusion section includes a front end portion in which a width in the vehicle width direction of a portion on a vehicle forward side of the rear end part is formed to be narrower than that near the fixation portion.

2. The vehicle front portion structure according to claim 1,
    wherein the fixation portion is a collar having an outer circumference that is connected to the protrusion section, and
    the protrusion section is extended outward in the vehicle width direction relative to the collar.

3. The vehicle front portion structure according to claim 2,
    wherein a portion on a vehicle forward side and a portion of a vehicle rearward side of the outer circumference of the collar is connected to the protrusion section by a connection portion.

4. The vehicle front portion structure according to claim 1,
    wherein the rear end part extends so as to be inclined downward toward the vehicle rearward direction from a rear end portion of a front side frame main body of the front side frame,
    the front side frame main body extends from a vehicle forward direction toward the vehicle rearward direction, and
    the protrusion section is formed such that a width in the vehicle width direction of a portion of the protrusion section at which the rear end part and the front side frame main body overlap each other is narrower than that near the fixation portion.

5. The vehicle front portion structure according to claim 1,
    wherein the protrusion section is provided at the vehicle forward position relative to the fixation portion and has a recess portion that is recessed downward.

* * * * *